July 25, 1961 W. M. WALKER 2,993,732
SAFETY APPARATUS
Filed Jan. 15, 1958 2 Sheets-Sheet 1

*INVENTOR.*
WILLIAM M. WALKER
BY Lockwood D Burton
ATTORNEY.

July 25, 1961   W. M. WALKER   2,993,732
SAFETY APPARATUS

Filed Jan. 15, 1958   2 Sheets-Sheet 2

INVENTOR.
WILLIAM M. WALKER
BY
ATTORNEY.

United States Patent Office 2,993,732
Patented July 25, 1961

2,993,732
SAFETY APPARATUS
William M. Walker, 62 E. Park Ave., Maple Shade, N.J.
Filed Jan. 15, 1958, Ser. No. 709,112
4 Claims. (Cl. 297—216)

This invention relates to shock absorber, and more particularly to safety arrangements for absorbing shocks incident to crashes involving passenger bearing motor vehicles.

In the art relating to passenger motor vehicles, whether those vehicles be automobile or aircraft, the trend is toward greater power and higher velocities. Crashes involving these vehicles have become increasingly frequent and violent. In an effort to reduce the number and seriousness of injuries to people involved in such crashes, many of the vehicles are provided with straps or belts. These straps have not proven to be entirely satisfactory. The violence of the crashes and the suddenness of the stops in the forward motion of the particular vehicle frequently result in injury to the passenger in the vehicle which is, in fact, directly due to the presence of the seat belt.

It is an object of the present invention to provide improved safety apparatus for use in passenger carrying vehicles.

It is another object of this invention to provide improved means for absorbing the shock incident to vehicular crashes.

It is a further object of this invention to provide improved shock absorbing means for use in conjunction with the seat structure of vehicles to reduce the shock transmitted to the occupants thereof in the event of a crash.

In accomplishing these and other objects, there has been provided, in accordance with the present invention, a piston and cylinder shock absorbing combination mounted in the structure of the vehicle. The seat frames of the vehicle are secured to piston rods connected to the pistons. In this manner, the seats are allowed to move, under damping restraint of the shock absorbers, through a limited distance, to considerably alleviate the shock upon passengers normally imposed by the seat belts in the event of a crash.

A better understanding of this invention may be had from the following detailed description when read in connection with the accompanying drawing, in which.

Figure 1:
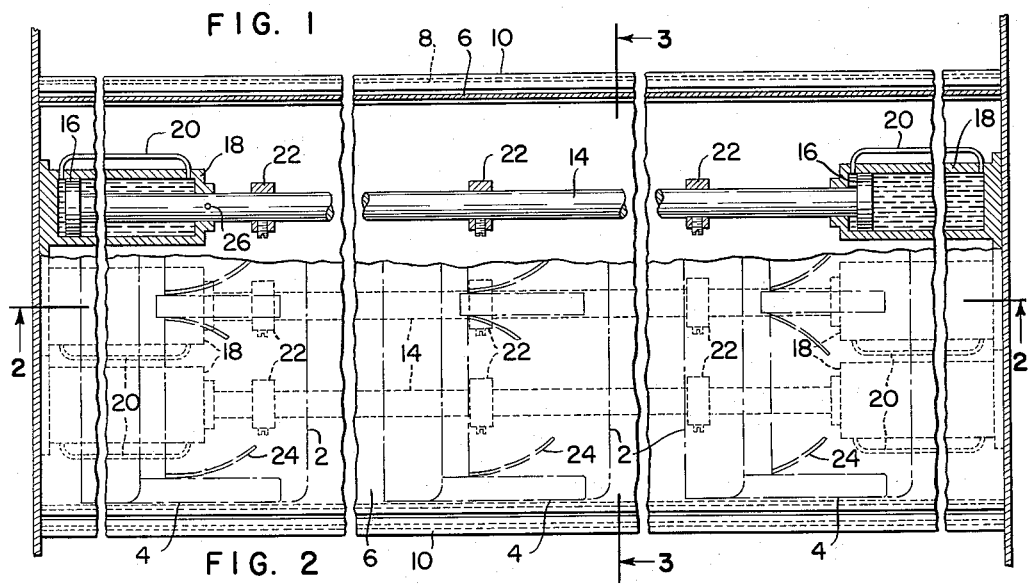
FIG. 1 is a plan view, partly in phantom, of apparatus according to the present invention as it may be applied to an airplane, auto bus or train.
Figure 2:
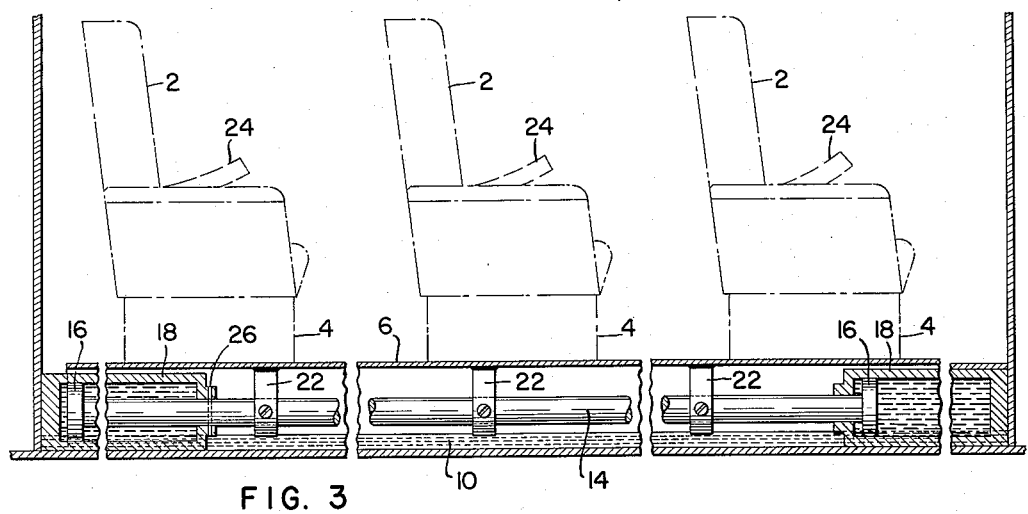
FIG. 2 is a side elevational view of the structure shown in FIG. 1.
Figure 3:
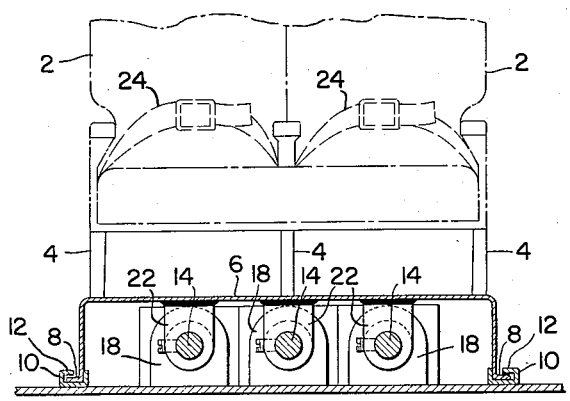
FIG. 3 is an end view of the structure shown in FIG. 1.

Referring now to the drawing in more detail, there is shown in FIGS. 1, 2 and 3, a shock absorbing arrangement for multi-seat passenger vehicles such as airplanes, trains, or busses. The arrangement includes a plurality of passenger seats 2, each mounted on a suitable seat frame 4. These seats 2 and seat frames or supports 4 may, of course, be of conventional construction.

The seat frames 4 are secured to a seat frame carriage member 6. This member 6 may comprise a channel-shaped member, as shown. The carriage member 6 is provided with a skirt or lip 8 on each edge. Each lip 8 is nested within a channel or guide member 10.

The channel members 10 are provided with an edge portion 12 which overlies the lip portion 8 of the carriage member 6.

The guide members 10 serve a two-fold purpose. First, they constitute tracks in which the carriage member is adapted to move, as set forth hereinafter. Second, they serve as retainers for restricting the motion of the carriage member to a plane which is parallel to the floor of the vehicle. It will be appreciated that the engaging portions of the lips 8 and the guides 10 may be provided with a suitable lubricant.

Underlying the carriage member 6, there is a plurality of shock-absorbing assemblies, three being illustrated. The shock-absorbing assemblies each include a shaft 14 which is provided with a piston 16 at either or both ends. The pistons 16 are adapted to be operated in a cylinder 18 which is filled with a suitable fluid such as oil or the like. A restricted passage way 20 connects the opposite ends of the cylinder 18. This restricted passage way may be in the form of a small tubing connecting the opposite ends of the cylinder, as shown. Other forms of restricted passages are also suitable, such as small apertures in and through the piston 16.

The cylinders 18 are secured to the main frame of the vehicle and may be of any suitable length deemed suitable for the type of vehicle, considering its space requirements and the probable velocity of impact in the event of a crash. This length may suitably vary from little over one foot to several feet, allowing a corresponding amount of damped movement of the carriage member; the carriage member being secured to the several shafts 14 by a series of yokes 22. These yokes 22 are securely fastened to the under side of the carriage member 6 and embrace and are keyed to the shafts 14.

When the passengers are in place in the seats of the vehicle, and have their seat belts 24 properly fastened, the operation of the herein described safety arrangement is as follows.

Figure 7:
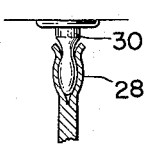
FIG. 7 is a view, partly in section of a suitable overload release element for use with the present invention.

The carriage member is normally held to the rear (to the left as viewed in the drawing) by an overload release device which may be in the form of a shear-pin 26 which keys one or more of the shafts 14 to its corresponding cylinder. Alternatively, the overload release device may take the general form of a suitable spring 28 and detent 30 clamp such as that shown in FIG. 7. In either case, the overload release devices hold the carriage member in a fixed position relative to the vehicle frame, until an excessive load, such as would be occasioned by a crash, is encountered. On such an occurrence, the over load release device releases the carriage member. Although the main body of the vehicle may have come to a sudden halt in its forward motion, the carriage member 6, together with the seats 2 and passengers strapped therein, is allowed to continue its motion forward at a rapidly decelerating velocity under the restraining influence of the pistons 16 operating in the fluid filled cylinders 18. This deceleration, although it may be obviously quite rapid, is far less apt to result in injury to the passengers than would the sudden shock of the abrupt stop that would occur if the seats were rigidly secured to the frame of the vehicle. Also the rapid deceleration would reduce, considerably, the tendency for the seats to be ripped from their moorings in the event of a crash.

Figure 4:
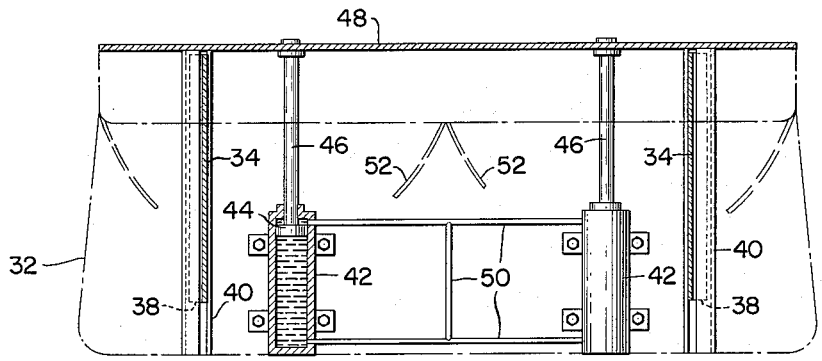
FIG. 4 is a plan view, partly in phantom, of structure according to the present invention as it may be applied to the rear seat of an automobile.
Figure 5:
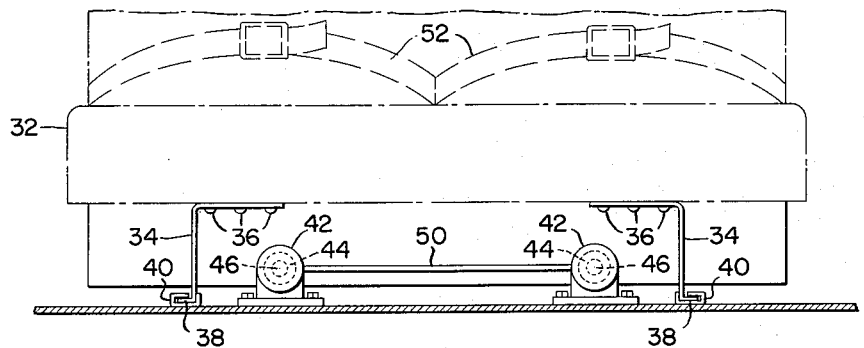
FIG. 5 is a fragmentary elevational view of the structure shown in FIG. 4, also partly a phantom.

In FIGS. 4 and 5, there is shown a comparable arrangement as applied to the rear seat of an automobile. Here, as before, the seat 32 is mounted on a seat frame carriage 34 which is in the form of either a channel member as previously discussed, or a pair of angle support members, as illustrated. In either case, the seat member is secured thereto by any suitable means, such as the rivets 36. As before, the carriage 34 is provided with a pair of out-turned lips 38 which are carried in channel guides 40. Again, each of these channel guides are provided with an edge portion which overlies the lip 38 of the carriage 34. This secures the carriage and restricts its movement to the direction which lies longitudinal of the vehicle.

Below the seat carriage 34, there is positioned a shock-absorbing assembly which is substantially similar to the shock absorbing assembly hereinbefore described. This assembly comprises a pair of fixed cylinders 42 which are filled with a suitable hydraulic fluid. Each of the cylinders is provided with a piston 44 which carries a driving rod 46. The driving rod 46 extends through a suitable bearing in the end of the cylinder to engage the back wall 48 of the carriage 34, to which it is firmly secured. Opposite ends of the cylinders 42 are connected by means 50 which constitute restricted passages for the fluid in the cylinder. Here, the means 50 is illustrated as being external tubes which provide a common restriction for the fluid from both cylinders. This arrangement provides a measure of balance to equalize the operation of the seat.

In operation, the seat is held normally in its rearmost position, with respect to the vehicle, by suitable overload release means, as explained hereinbefore. In the event of a crash, the shock incident thereto releases the overload release device, allowing the seat to move forward under the inertia of the mass of the seat and passengers. The forward motion of the seat is, of course, rapidly decelerated by the operation of the pistons in the cylinders. In the same manner as previously described, the violence of the shock incident to a crash is greatly alleviated if the passengers are secured to the seat by seat belts 52.

Figure 6:
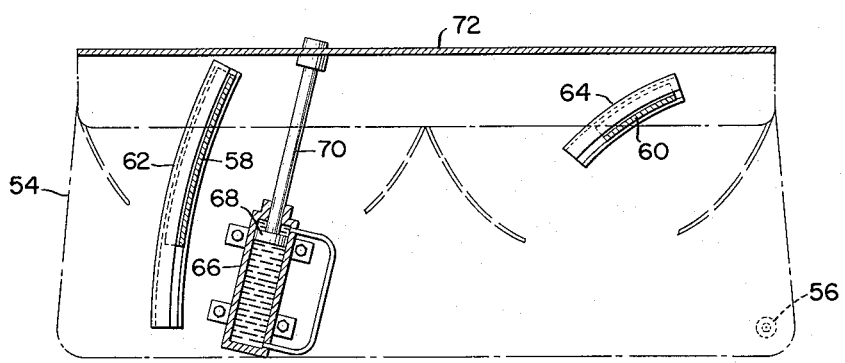
FIG. 6 is a plan view, partly in phantom, of structure according to the present invention as it might be applied to the front seat of an automobile.

The front seat of an automobile cannot be permitted to move forward, linearly, since the driver would thereby probably encounter the steering wheel with unfavorable results. However, statistically it appears that the driver of a vehicle is least often and less seriously injured of any other occupant of the car. This may be due to the fact that he is able to absorb some of the shock through his arms and legs being in engagement with the operating controls of the car. The other front seat occupant has not fared so well, statistically. Accordingly, there is shown in FIG. 6 an arrangement embodying the present invention wherein a measure of shock-absorption is provided for the front seat passenger of an automobile without increasing the driver's hazards. The front seat 54 is pivoted in the driver's position about a stout pivot member 56. Here, too, the seat 54 is mounted on a seat frame carriage. However, in this instance, the carriage comprises a pair of arcuate bracket members 58 and 60, respectively. Each of these brackets operates in its own channel guide 62 and 64, respectively. Although curved, these channel guides operate in the same manner as the straight guides to limit the freedom of movement of the seat. In this instance, the freedom of movement is along the arcuate path about the pivot 56. Again, there is provided a cylinder 66 in which a piston 68 is adapted to operate against the dampening influence of the fluid in the cylinder. There is provided a restricted path for the fluid to flow under the compressive force of the piston when it is operated. This restricted path is illustrated by an external tubing which connects the opposite ends of the cylinder. Suitable compensating means, not shown, may be provided to enable the piston and cylinder to accommodate the curvilinear motion through which it must operate. As before, the piston is connected, through a driving rod 70 to a back wall portion 72 of the seat frame.

In this arrangement, when a crash occurs, the end of the seat opposite from the driver is permitted to move, under the restraint of the shock-absorbing assembly, in a limited arc about a pivot under the driver's seat. This permits the shock of the crash to be absorbed for the benefit of the front seat passenger without jamming the driver into the steering wheel.

It may now be seen that there has been provided, in accordance with this invention, an improved safety apparatus for use in passenger vehicles wherein means associated with the seating facilities is provided for absorbing, to a large extent the shock incident to a crash.

What is claimed is:

1. Safety apparatus for multi-seat passenger vehicles comprising, in combination, a plurality of seat structures, movable carriage means for said seat structures, said seat structures being rigidly secured to said carriage means, guide means for restricting the movement of said carriage means to a direction parallel to the direction of travel of said vehicle, shock absorbing means including a plurality of pairs of cylinders each cylinder having a piston arranged for movement therein, a relatively incompressible fluid within each of said cylinders, means associated with each of said cylinders for defining a restricted passageway for said fluid around said piston, a drive rod for each pair of pistons associated with corresponding pairs of cylinders, the pistons of each of said pairs being connected to opposite ends of said drive rods, and means securing said carriage means to each of said drive rods.

2. Safety apparatus as set forth in claim 1 and characterized by the addition of overload release means for holding said carriage means in a normal position during ordinary operation of said vehicle and arranged to release said carriage for restricted movement in the event of a crash of said vehicle.

3. The invention as set forth in claim 2 wherein said overload release means comprises a shear means associated with at least one of said drive rods.

4. The invention as set forth in claim 2 wherein said overload release means comprises a spring and detent clamp.

References Cited in the file of this patent

UNITED STATES PATENTS

| 396,108 | Nickerson | Jan. 15, 1889 |
| 2,109,728 | Kovach | Mar. 1, 1938 |
| 2,346,895 | Bergman | Apr. 18, 1944 |
| 2,401,748 | Dillon | June 11, 1946 |
| 2,725,921 | Markin | Dec. 6, 1955 |
| 2,818,909 | Burnett | Jan. 7, 1958 |

FOREIGN PATENTS

| 42,243 | France | Mar. 21, 1933 |